(12) United States Patent
Watanabe et al.

(10) Patent No.: US 10,917,616 B2
(45) Date of Patent: *Feb. 9, 2021

(54) IMAGING SYSTEM AND IMAGING DEVICE

(71) Applicant: TOSHIBA LIFESTYLE PRODUCTS & SERVICES CORPORATION, Ome (JP)

(72) Inventors: Kota Watanabe, Tokyo (JP); Hirokazu Izawa, Tokyo (JP); Kazuhiro Furuta, Tokyo (JP); Yuuki Marutani, Tokyo (JP)

(73) Assignee: TOSHIBA LIFESTYLE PRODUCTS & SERVICES CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,197

(22) Filed: May 16, 2019

(65) Prior Publication Data

US 2019/0273897 A1 Sep. 5, 2019

Related U.S. Application Data

(63) Continuation of application No. 15/053,536, filed on Feb. 25, 2016, now Pat. No. 10,362,275, which is a
(Continued)

(30) Foreign Application Priority Data

Aug. 28, 2013 (JP) .................................. 2013-176756

(51) Int. Cl.
*H04N 7/18* (2006.01)
*F25D 29/00* (2006.01)
(Continued)

(52) U.S. Cl.
CPC ............ *H04N 7/183* (2013.01); *F25D 27/005* (2013.01); *F25D 29/00* (2013.01); *F25D 29/005* (2013.01);
(Continued)

(58) Field of Classification Search
CPC ........ F25D 29/005; F25D 27/005; F25D 29/00; H04N 7/183; H04N 5/2257;
(Continued)

(56) References Cited

U.S. PATENT DOCUMENTS 5,691,684 A   11/1997   Murrah
5,915,091 A * 6/1999   Ludwig .................. G06Q 10/10
                                                              348/E7.081
(Continued)

FOREIGN PATENT DOCUMENTS

CN   101640789   2/2010
CN   102455111   5/2012
(Continued)

OTHER PUBLICATIONS

U.S. Appl. No. 15/053,536, US 2016-0173830, Jun. 16, 2016, Patented.
(Continued)

*Primary Examiner* — Philip P. Dang
(74) *Attorney, Agent, or Firm* — DLA Piper LLP US

(57) ABSTRACT

In one embodiment, an image capturing system is configured so that a device for capturing images is communicable with an external device through a communication unit. The image capturing system is provided with an operating unit configured to make settings pertaining to image capturing, an image capturing device serving as the device for capturing images and being configured to produce image data by periodically capturing images based on the settings made to
(Continued)

the operating unit and a display unit configured to produce a display output based on the image data.

8 Claims, 6 Drawing Sheets

Related U.S. Application Data continuation of application No. PCT/JP2014/071562, filed on Aug. 18, 2014.

(51) Int. Cl.
    *H04N 5/232*       (2006.01)
    *H04N 5/235*       (2006.01)
    *F25D 27/00*       (2006.01)
    *H04N 5/225*       (2006.01)

(52) U.S. Cl.
    CPC ......... *H04N 5/2257* (2013.01); *H04N 5/2351* (2013.01); *H04N 5/23206* (2013.01); *H04N 5/23241* (2013.01); *H04N 5/23245* (2013.01); *H04N 5/232411* (2018.08); *H04N 5/232939* (2018.08)

(58) Field of Classification Search
    CPC ............. H04N 5/23245; H04N 5/2351; H04N 5/23241; H04N 5/23206
    See application file for complete search history.

(56) References Cited

U.S. PATENT DOCUMENTS

| | | | |
|---|---|---|---|
| 5,926,210 A | 7/1999 | Hackett et al. | |
| 5,978,835 A * | 11/1999 | Ludwig | G06Q 10/10 348/E7.081 |
| 6,204,763 B1 | 3/2001 | Sone | |
| 6,353,848 B1 * | 3/2002 | Morris | H04L 61/1535 709/203 |
| 6,732,158 B1 * | 5/2004 | Hesselink | G09B 19/00 709/208 |
| 6,959,322 B2 * | 10/2005 | Ludwig | G06Q 10/10 709/204 |
| 6,985,178 B1 * | 1/2006 | Morita | G06T 1/0007 348/211.3 |
| 7,009,637 B2 * | 3/2006 | Sawachi | H04N 5/23245 348/211.99 |
| 7,218,315 B2 | 5/2007 | Takeuchi | |
| 7,342,489 B1 * | 3/2008 | Milinusic | G08B 13/19604 340/506 |
| 7,447,330 B2 | 11/2008 | Yamasaki | |
| 7,573,504 B2 * | 8/2009 | Takane | H04N 5/772 348/220.1 |
| 7,583,901 B2 * | 9/2009 | Nakagawa | H04B 10/1141 398/183 |
| 7,686,222 B2 * | 3/2010 | Ehrhart | G06K 7/1413 235/462.2 |
| 7,773,802 B2 * | 8/2010 | Komiya | H04N 9/0455 382/162 |
| 7,847,729 B2 * | 12/2010 | Tysowski | G01S 19/42 342/357.62 |
| 7,884,847 B2 * | 2/2011 | Kojima | G06K 9/4652 348/22 |
| 7,920,898 B2 | 4/2011 | Callaghan | |
| 8,081,237 B2 | 12/2011 | Ito | |
| 8,144,055 B2 * | 3/2012 | Tysowski | G01S 19/14 342/357.63 |
| 8,407,097 B2 * | 3/2013 | Sperduti | G06Q 20/20 705/22 |
| 8,471,912 B2 | 6/2013 | Yoneyama | |
| 8,488,000 B2 | 7/2013 | Nagai | |
| 2004/0179100 A1 | 9/2004 | Ueyama | |
| 2005/0099500 A1 * | 5/2005 | Fujita | H04N 21/42202 348/207.99 |
| 2006/0274153 A1 | 12/2006 | Levien | |
| 2007/0139529 A1 | 6/2007 | Levien | |
| 2008/0014917 A1 | 1/2008 | Rhoads | |
| 2008/0309617 A1 | 12/2008 | Kong | |
| 2009/0021573 A1 | 1/2009 | Kim | |
| 2009/0315671 A1 | 12/2009 | Gocho | |
| 2010/0045816 A1 * | 2/2010 | Rhoads | G06K 9/228 348/222.1 |
| 2010/0231506 A1 | 9/2010 | Pryor | |
| 2010/0283573 A1 * | 11/2010 | Yum | G05B 15/02 340/3.1 |
| 2011/0243532 A1 | 10/2011 | Bostaph | |
| 2012/0082390 A1 * | 4/2012 | Kawasaki | A61B 1/00022 382/232 |
| 2012/0218301 A1 | 8/2012 | Miller | |
| 2012/0229616 A1 | 9/2012 | Koike | |
| 2012/0307112 A1 * | 12/2012 | Kunishige | H04N 5/772 348/239 |
| 2013/0083211 A1 * | 4/2013 | Kunishige | H04N 5/2621 348/220.1 |
| 2013/0088618 A1 * | 4/2013 | Kunishige | H04N 5/23245 348/239 |
| 2013/0109406 A1 * | 5/2013 | Meador | H04W 4/33 455/456.1 |

FOREIGN PATENT DOCUMENTS

| | | |
|---|---|---|
| CN | 103037153 | 4/2013 |
| CN | 105474618 | 4/2016 |
| CN | 110213477 | 9/2019 |
| CN | 110260585 | 9/2019 |
| CN | 110260586 | 9/2019 |
| JP | 2002-236798 | 8/2002 |
| JP | 2002-267336 | 9/2002 |
| JP | 2002-295959 | 10/2002 |
| JP | 2003-042626 | 2/2003 |
| JP | 2003-207258 | 7/2003 |
| JP | 2005-167634 | 6/2005 |
| JP | 2006-080889 | 3/2006 |
| JP | 2006-236076 | 9/2006 |
| JP | 2007-046833 | 2/2007 |
| JP | 2007-046834 | 2/2007 |
| JP | 2012-226748 | 11/2012 |

OTHER PUBLICATIONS

Taiwanese Office Action issued in TW 10520448560 dated Apr. 15, 2016 with English Translation.
International Search Report dated Nov. 11, 2014 issued in PCT/JP2014071562.
English Language Translation of JP 2002-295959 issued Oct. 9, 2002.
English Language Translation of JP 2003-207258 issued Jul. 25, 2003.
English Language Translation of JP 2006-236076 issued Sep. 7, 2006.
English Language Translation of JP 2005-167634 issued Jun. 23, 2005.
English Language Translation of JP 2006-080889 issued Mar. 23, 2006.
English Language Translation of JP 2002-236798 issued Aug. 23, 2002.
English Language Translation of JP 2002-267336 issued Sep. 18, 2002.
English Language Abstract of JP 2003-042626 issued Feb. 13, 2003.
English Language Translation of JP 2007-046834 issued Feb. 22, 2007.
English Language Translation of CN 102455111 issued May 16, 2012.
English Language Translation of JP 2012-226748 issued Nov. 15, 2012.
Japanese Office Action (with English Translation) issued in JP 2013-176756 dated Oct. 4, 2016.
Korean Office Action (with English Translation) issued in KR 10-2016-7003897 dated Nov. 10, 2016.

(56) References Cited

OTHER PUBLICATIONS

English Language Translation of JP 2007-046833 issued Feb. 22, 2017.
Supplemental European Search Report issued in EP 14840500.4 dated Mar. 2, 2017.
Extended European Search Report issued in EP 14840500.4 dated Jun. 20, 2017.
Chinese Office Action in CN Application No. 201910212923.63 dated Aug. 5, 2020.
European Office Action in EP Application No. 14 840 500.4, dated Jul. 9, 2020.
M Recommended Practice et al.:"APTA Selection of Cameras, Digital Recording Systems, Digital High-Speed Networks and Trainlines for Use in Transit-Related CCTV Systems Contents", Jun. 1, 2011 (Jun. 1, 2011), XP055711093, Retrieved from Internet: URL:https://www.apta.com/wp-content/uploads/Standards_Documents/APTA-IT-CCTV-RP001-11.pdf.
Chinese Office Action in CN Application No. 201910212222.2, dated Jun. 22, 2020.
Chinese Office Action in CN 201910212650.5 dated Aug. 27, 2020.
Chinese Office Action in CN 201910212785.1 dated Aug. 20, 2020.

* cited by examiner

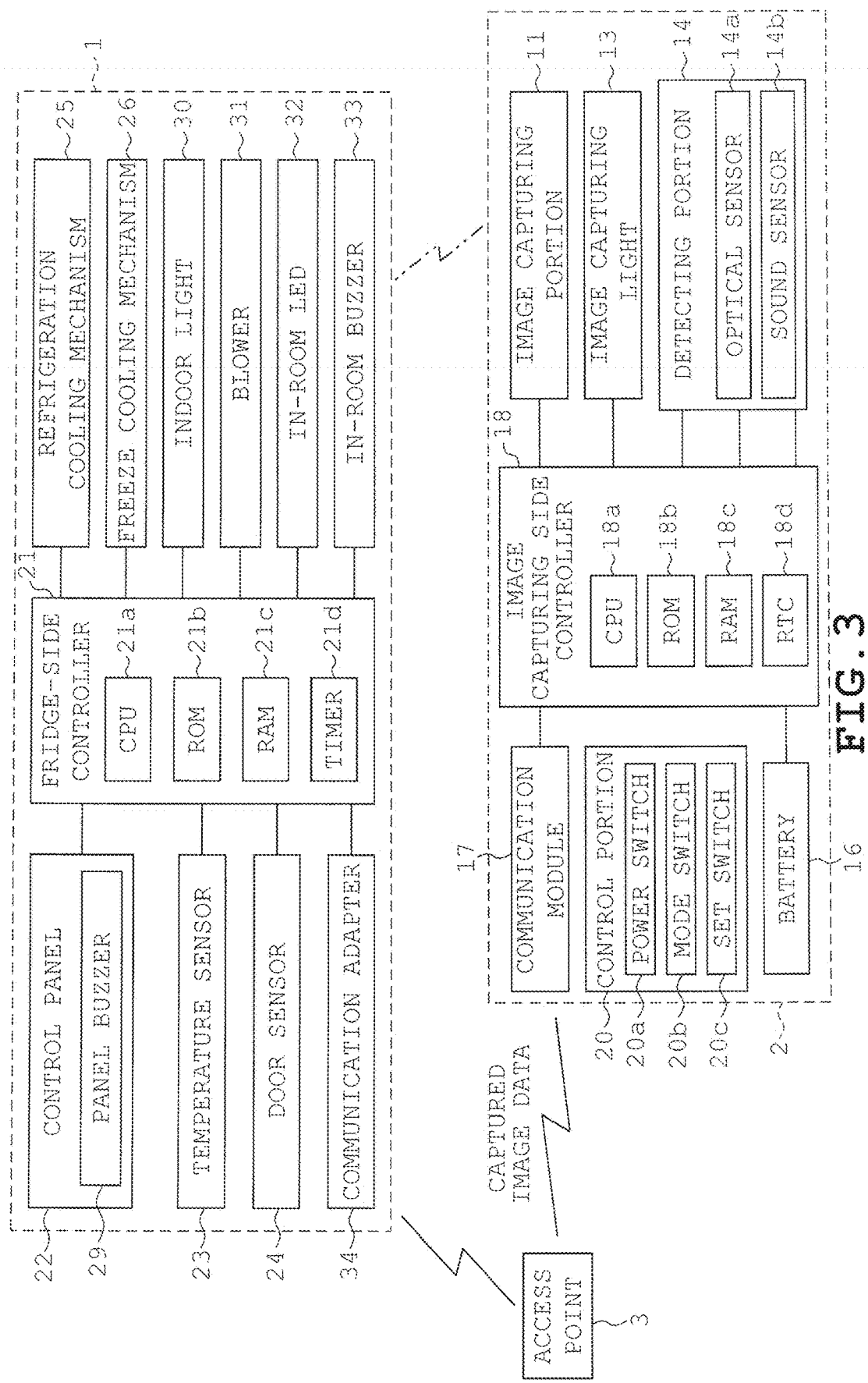

IMAGING SYSTEM AND IMAGING DEVICE

CROSS-REFERENCE TO RELATED APPLICATION(S)

This application is a continuation of U.S. application Ser. No. 15/053,536 filed Feb. 25, 2016, which is a continuation of International Application No. PCT/JP2014/071562, filed on Aug. 18, 2014 which is based upon and claims the benefit of priority from Japanese Patent Application No. 2013-176756, filed Aug. 28, 2013. The contents of each are incorporation herein by reference in their entirety.

FIELD

Embodiments disclosed herein relate to an image capturing system and an image capturing device.

BACKGROUND

A refrigerator system using a camera has been proposed to obtain information of food stored inside the refrigerator.

Unlike the so-called security camera, the above described camera requires user instructions every time an image of the fridge interior is to be captured in order to obtain information of the fridge interior. That is, a camera provided with an image capturing portion requires troublesome operations such as acquiring image data by user operation of the operating portion.

BRIEF DESCRIPTIONS OF THE DRAWINGS

FIG. 3 is schematically illustrates an electric configuration of the image capturing device and the in-fridge image capturing system.

Figure 4:
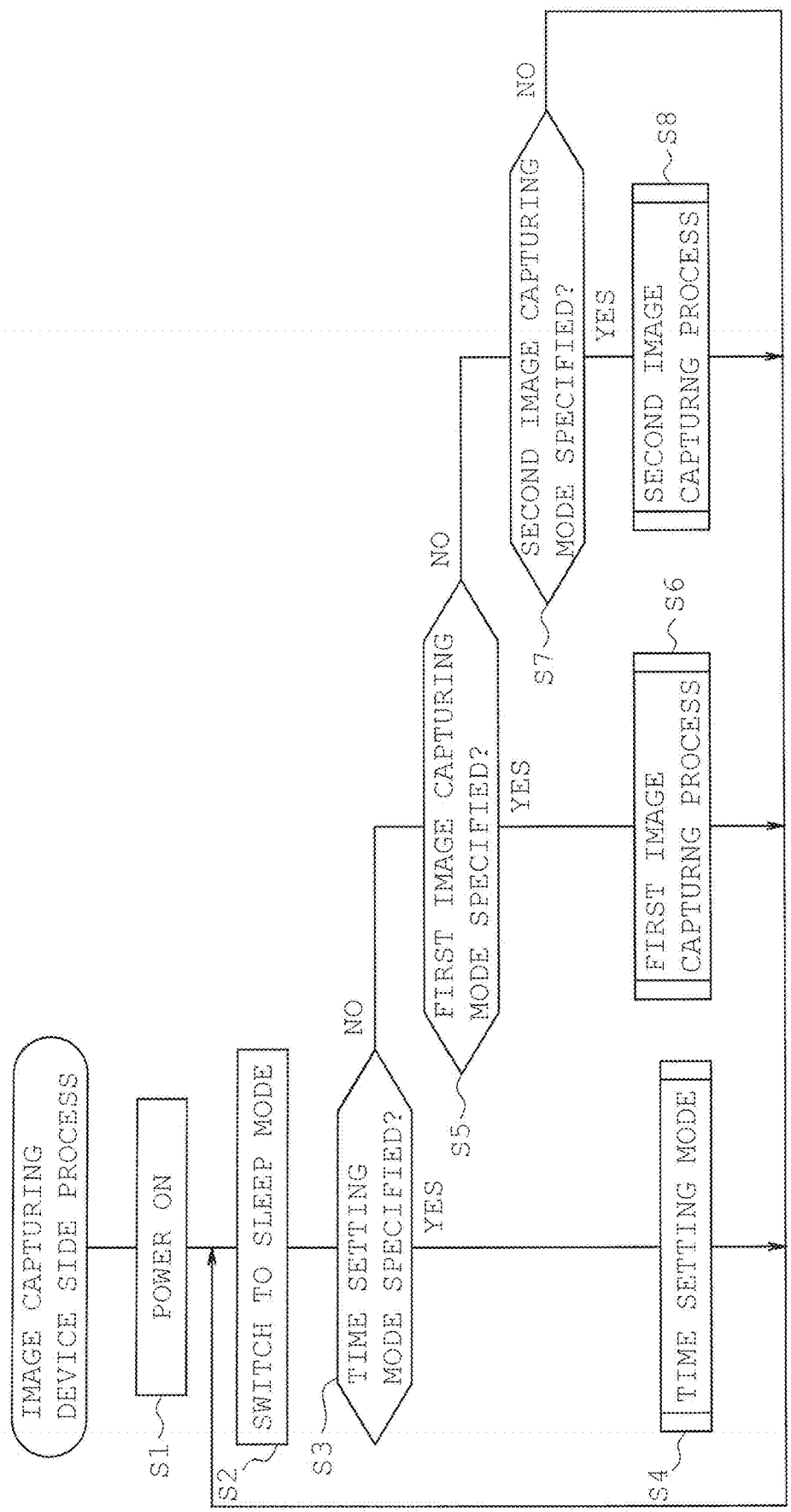
Figure 5:
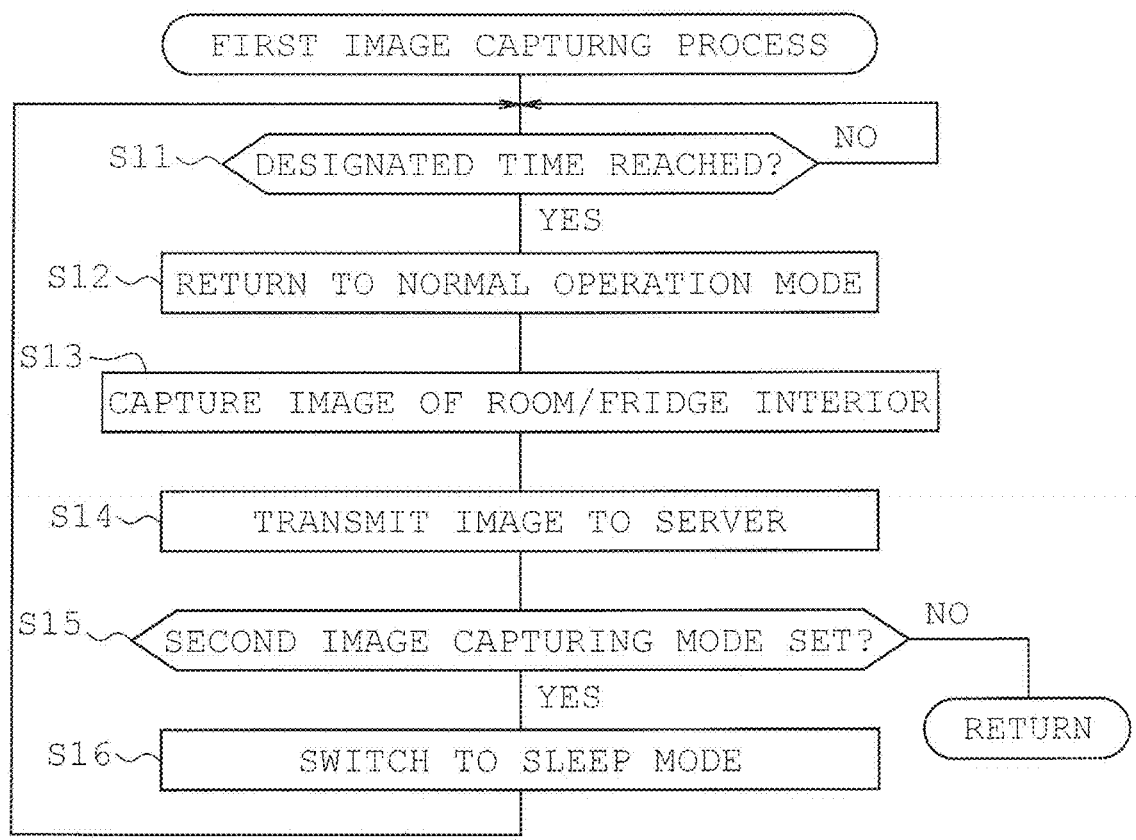
Figure 6:
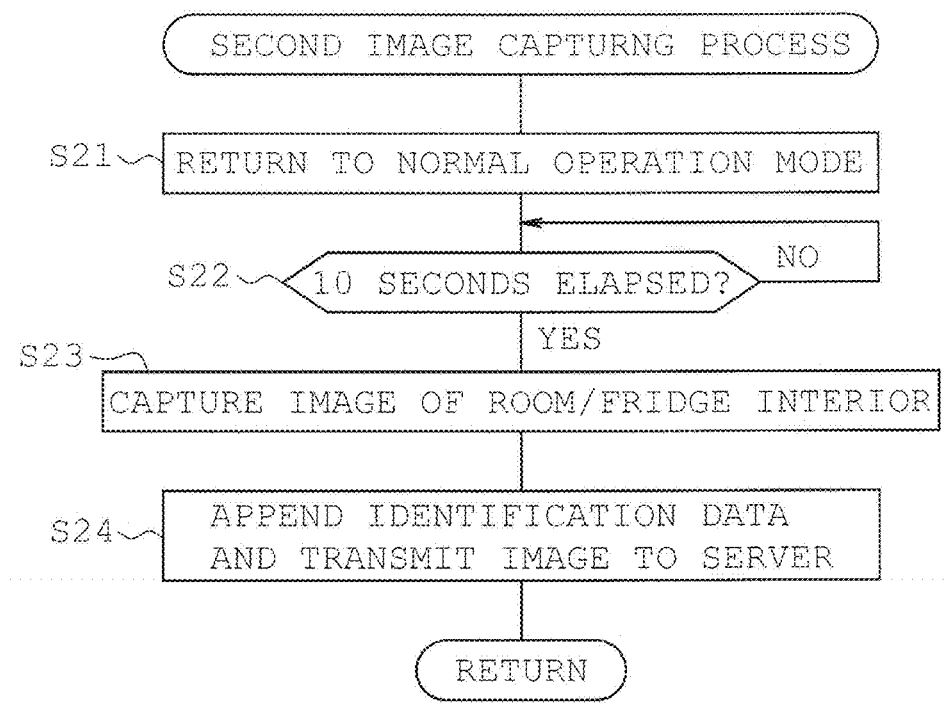

FIG. 4 is a flowchart of a main process.
FIG. 5 is a flowchart of a first image capturing process.
FIG. 6 is a flowchart of a second image capturing process.

DESCRIPTION

In one embodiment, an image capturing system is configured so that a device for capturing images is communicable with an external device through a communication unit. The image capturing system is provided with an operating unit configured to make settings pertaining to image capturing, an image capturing device serving as the device for capturing images and being configured to produce image data by periodically capturing images based on the settings made to the operating unit and a display unit configured to produce a display output based on the image data.

In one embodiment, an image capturing device is used in an image capturing system provided with a display unit configured to produce a display output based on image data and an operating unit configured to make settings pertaining to image capturing. The image capturing device is provided with an image capturing portion configured to produce image data by periodically capturing images based on the settings made to the operating unit; and a communication unit configured to communicate with an external device. The image data is transmittable to the external device through the communication portion.

Embodiments disclosed herein provide an image capturing system and an image capturing device with improved usability to be suitable for practical use.

A description will be given on one embodiment with reference to FIGS. 1 to 6.

Figure 1:
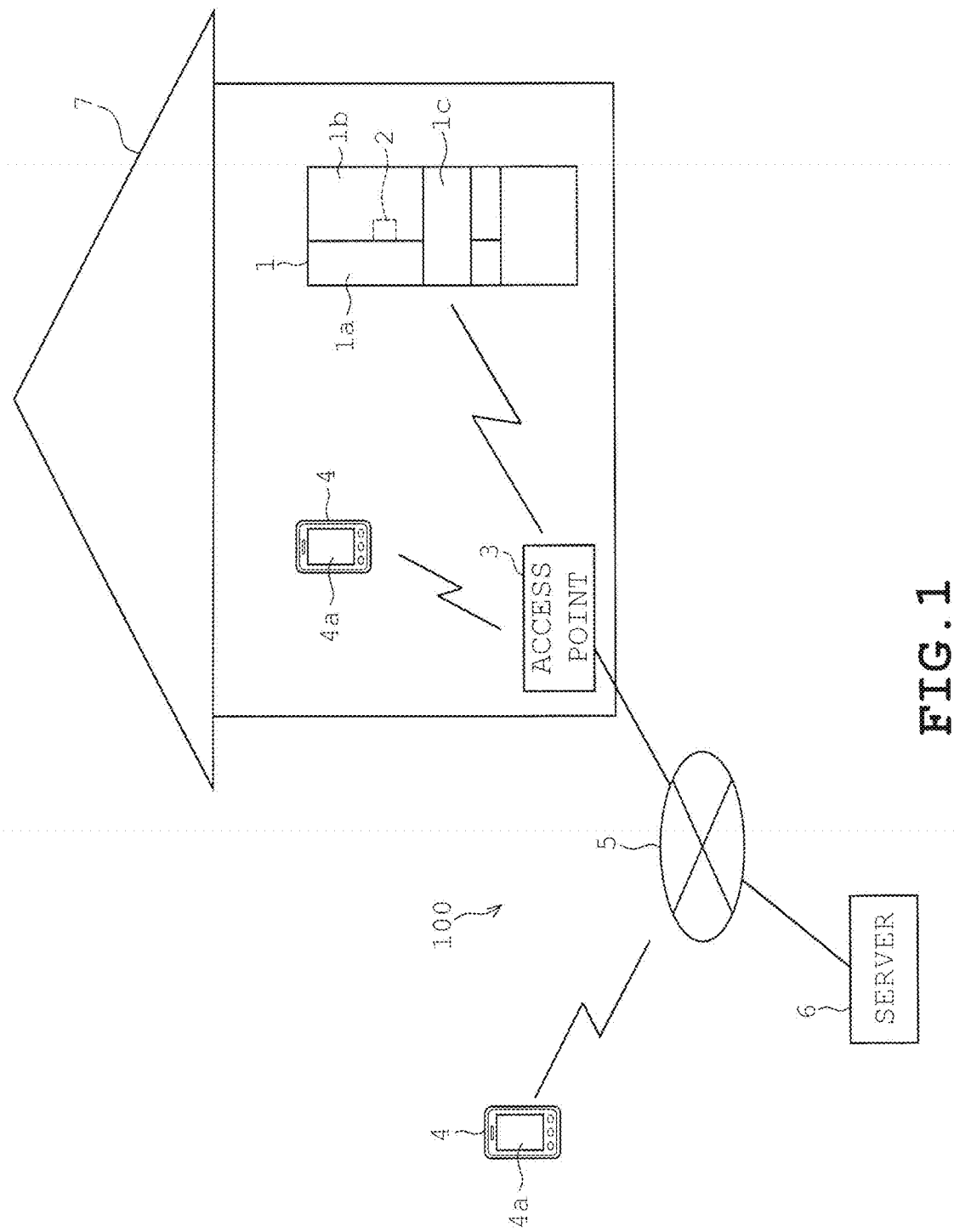
FIG. 1 is a schematic view of an image capturing system of one embodiment.

As illustrated in FIG. 1, an image capturing system 100 of the present embodiment is configured by a refrigerator 1 being one example of a home appliance, an image capturing device 2 for capturing an in-room image, an access point 3, and an external device such as a mobile terminal 4, etc. The access point 3 is connected to an external network 5 and is configured to communicate with the image capturing device 2, etc. The access point 3 communicably interconnects the mobile terminal 4 and a server 6, etc. located in remote locations with the image capturing device 2 side or the refrigerator 1 side by way of the external network 5. In the present embodiment, a Bluetooth (registered trademark) wireless communication is exchanged between the image capturing device 2 and the access point 3; between the access point 3 and the mobile terminal 4; and between the refrigerator 1 and the access point 3.

The mobile terminal 4 is provided with a display screen 4a configured to display image data captured by the image capturing device 2. The mobile terminal 4 serves as a communication terminal and examples of a communication terminal envisaged in the present embodiment include the so-called smart phone (highly functional mobile phone). Examples of the communication terminals include, apart from the mobile terminal 4 discussed herein, a tablet PC. When the mobile terminal 4 is located inside a residence 7, the mobile terminal 4 is communicably connected to the access point 3 by a close-range wireless communication. When the mobile terminal 4 is located outside the residence 7, the mobile terminal 4 is communicably connected to the access point 3 by a wide-range wireless communication by way of external network 5. The mobile terminal 4 is further capable of connecting to the access point 3 by way of the external network 5 through wide-range communication even when located inside of the residence 7. The mobile terminal 4 located inside the residence 7 is further capable of communicating directly with the camera device side 2 or the refrigerator 1 side without the intervention of the access point 3.

The server 6 is configured by a computer system known in the art. The server 6 is provided with a storing unit configured to store image data captured by the image capturing device 2. The storing unit of the server 6 includes nonvolatile memory such as a ROM, volatile memory such as a RAM, and electrically rewritable nonvolatile memory such as an EEPROM. The storing unit of the server 6 stores information (such as an IP address) for accessing the image capturing device 2. The mobile terminal 4 and the server 6, etc. are provided with a display unit (only the display screen 4a of the mobile terminal 4 is illustrated in FIG. 1) configured to produce a display output based on the image data. The mobile terminal 4 and the server 6, etc. are examples of an external device. The display unit may be provided at the image capturing device 2.

By interconnecting the home appliances such as the refrigerator 1 over a network (see communication adaptor 34 of FIG. 3), it is possible to: visualize the electric power consumption of each home appliance for the user's reference; shift the peak of electric power consumption during the day time in summer for example when there is a large demand for electric power; perform various controls of electric power consumption such as peak cutting in which a momentary use of electric power exceeding the rated level in a general household is inhibited; perform failure diagnosis of home appliances, etc. The network of home appliances provides a user friendly, convenient, and an easy to use system by offering functionalities such as those exemplified above.

The image capturing device 2 of the present embodiment is installed to the refrigerator 1 by the user so that images of the status inside the refrigerator 1 (that is, the status of items stored in the fridge) can be captured. Various information pertaining to each of the home appliances and image data captured by the image capturing device 2, etc. is stored in the server 6 or transmitted to the mobile terminal 4. It is thus, possible to view such information through the mobile terminal 4, etc. over the external network 5 any time even from remote locations.

The refrigerator 1, being one example of a storage, is provided with a refrigeration chamber in its upper portion. The refrigeration chamber is opened/closed by left and right doors 1a and 1b taking a double door configuration. For example, the image capturing device 2 is disposed in the rear surface side (at the door pocket not illustrated in the inner side) of the right side door 1b having the greater lateral dimension among the doors 1a and 1b (see the double-dot chain line illustrated in FIG. 1). The image capturing device 2 is to be further installed in a position allowing easy look of the fridge interior such as at the rear surface side of a drawer-type door 1c in the vegetable chamber located below the refrigeration chamber.

The front surface of the doors 1a to 1c of the refrigerator 1 are covered by a glass plate formed of an insulative glass allowing permeation of radio waves. The interior of the doors 1a to 1c are packed with a fill material such as urethane serving as a thermal insulation material. The rear surfaces of doors 1a to 1c are configured by a nonmetallic resin plate. Thus, radio waves for wireless communication outputted from the image capturing device 2 are allowed to permeate more easily compared to doors 1a to 1c formed of metal plate, or the like. Thus, especially in a double-door configuration as in the case of doors 1a and 1 b, it is possible to easily let out the radio waves from the clearance between the doors 1a and 1b by disposing the image capturing device 2 in the opening end side of the right-side door 1b as indicated by a double-dot chain line in FIG. 1 to be located in the central portion in the later direction of the refrigeration chamber. According to the above described positioning of the image capturing device 2, radio waves are easily let out from the fridge even when the front surfaces of the doors 1a and 1b are made of metal material, and the possibility of the radio waves being blocked is small since the interiors of the doors 1a and 1b are filled with urethane.

A vacuum thermal insulation material may be used instead of urethane or with urethane to serve as a thermal insulation material of the refrigerator 1. The vacuum insulation material is formed into a thin rectangular plate for example by wrapping a core material with glass fiber, etc. with a film formed by adhering (laminating) a metal foil (aluminum foil for example) on a film made of synthetic resin for example. When the vacuum thermal insulation material is used in the inside of the body and the doors of the refrigerator 1, it is possible to facilitate propagation of the radio waves to the fridge exterior by avoiding the use of vacuum thermal material near the image capturing device 2. It is thus, possible to facilitate the propagation of radio waves while maintaining the heat insulativity of the refrigerator 1 as much as possible and allow information from the image capturing device 2 to be transmitted to external devices without the intervention of the communication adaptor 34 of the refrigerator 1.

Next, a description is given on the image capturing device 2.

Figure 2A:
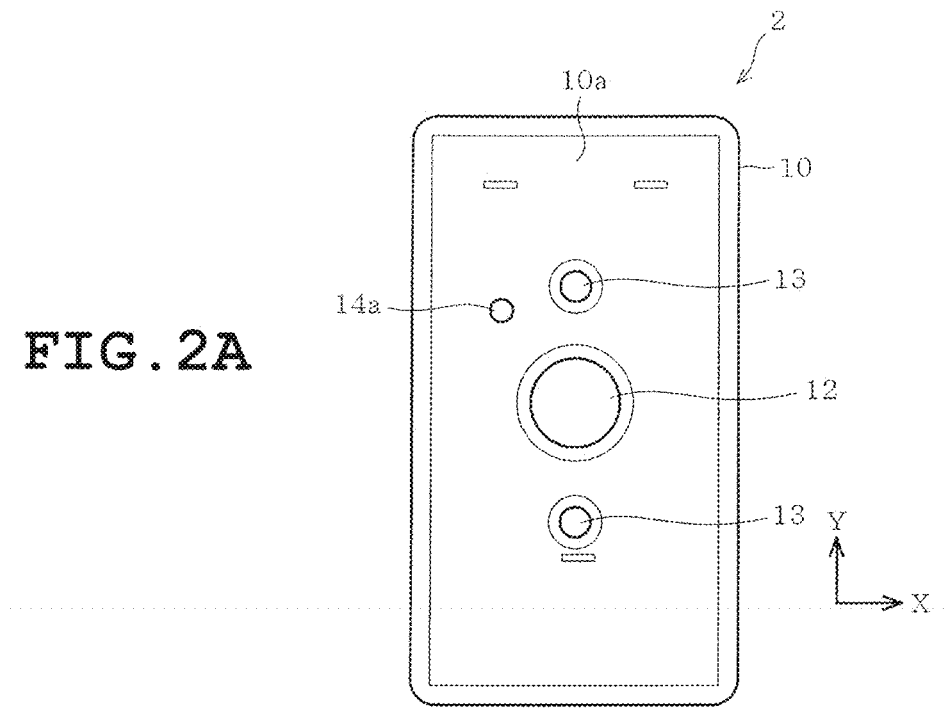
FIG. 2A is a front view illustrating the external look of an image capturing device and FIG. 2B is a vertical cross-sectional view illustrating an internal structure of the image capturing device.

The image capturing device 2 has a body 10 serving as an outer shell shaped like a cuboid as illustrated in FIG. 2A. The image capturing device 2 comprises a camera provided with a lighting unit allowing images to be captured in a dark room such as the interior of the refrigerator 1. An image capturing lens 12, an image capturing lighting 13, and a light sensor 14a are provided on the body 10 in an exposed manner. A description is given hereinafter with an assumption that the exposed side of the body 10 where the lens 12, etc. are exposed (the right side in FIG. 2B) is the main surface 10a of the image capturing device 2 and the opposite side is the rear surface. The lens 12 and the light 13 may be hidden under a cover, etc. instead of being exposed outside the body 10.

Figure 2B:
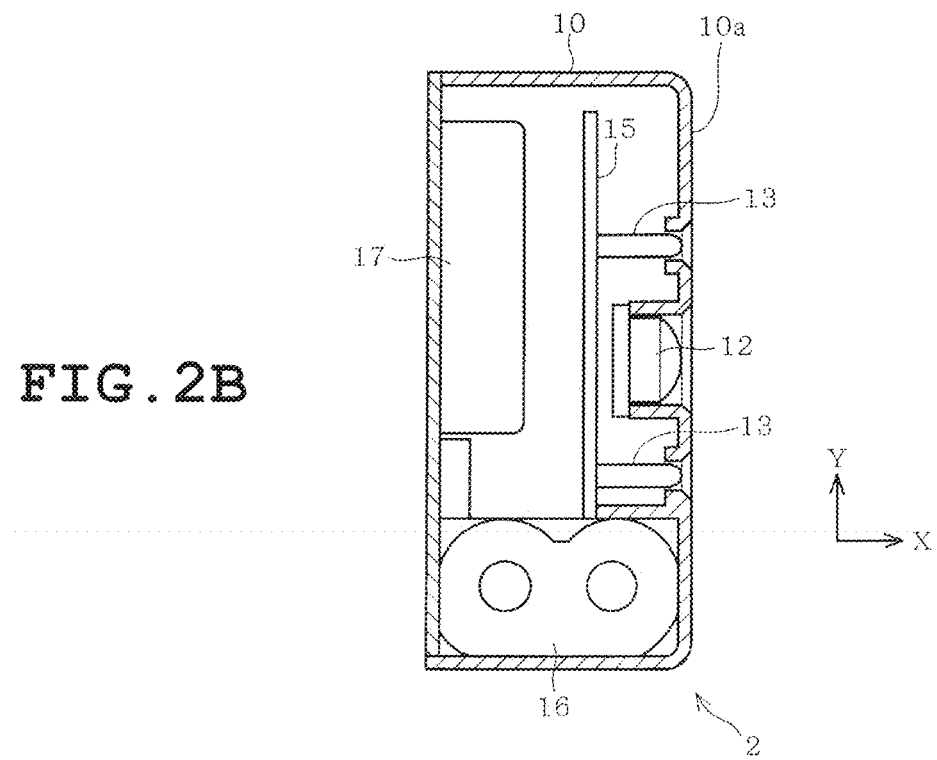

As illustrated in FIG. 2B, a control substrate 15, a battery 16, and a communication module 17 are stored inside the body 10. For example, a couple of lights 13 comprising an LED and the lens 12 are implemented on the control substrate 15. The couple of lights 13 are disposed in two opposing sides of the lens 12. The direction of irradiation of the lights 13 is oriented in the direction of image capturing of the image capturing device 2 so that the interior of the dark room is illuminated by the light irradiated when image is captured. The lights 13 and the optical sensor 14a serve as the lighting unit. An image capturing portion 11 (illustrated in FIG. 3), configured by elements such as CCD and CMOS known in the art, and image capturing side controller 18 are provided on the control substrate 15.

The battery 16 supplies electric power to a detecting portion 14, image capturing side controller 18, and the communication module 17, etc. The image capturing device 2 is driven by the battery 16 installed therein. The image capturing device 2 is capable of running without power plug cable, etc. and thus, may be installed in any location. In the present embodiment, the image capturing device 2 may be installed inside a storage such as the refrigeration 1 of the present embodiment provided with a door.

The communication module 17 is configured to transmit image data of the fridge interior captured by the image capturing portion 11 to external devices and also serves as a communication portion for receiving time information later described. The image data is transmitted to the mobile terminal 4, the server 6, etc. by way of the access point 3. The server 6 stores the transmitted image data. The image data is data containing captured images of the fridge interior. Examples of image data include data (still image, moving image) of known formats such as a bit map format and JPEG/MPEG format and compressed/encrypted forms of such data as well as converted forms of such data converted by image processing. The image data may come in any format as long as the interior of a storage can be viewed through the mobile terminal 4 or the like.

An operating portion 20 (see FIG. 3) configured by various switches are provided on a side portion of the body 10. The various switches provided in the operating portion 20 include various switches pertaining to image capturing such as a power switch 20a, a mode switch 20b, and, a set switch 20c. More specifically, the power switch 20a is an operating portion configured to turn ON/OFF the power of the image capturing device 2. Mode switch 20b serves as a mode setting unit. It is possible to select either of a time setting mode, a first image capturing mode, and a second image capturing mode by operating the mode switch 20b.

The time setting mode sets the time of an RTC 18d (see FIG. 3) of an internal clock. The image capturing side controller 18 executes operations and controls at the time designated by the image capturing device 2, keeps track of time, etc. by referring to the time indicated by the RTC 18d. The image capturing device 2 is capable of communicating with the external network 5 through the communication module 17. In the time setting mode, the image capturing device 2 sets the time of the RTC 18d using the time acquired by a time server (a sever capable of transmitting time information) not illustrated which is independent of the server 6.

The first image capturing mode captures images periodically with a prescribed periodicity. The image capturing side controller 18 performs image capturing automatically under the first imaging capturing mode at the designated time (such as 3 o'clock in the afternoon) at precise period (24 hour period for example) by referring to the time tracked by RTC 18d. Thus, by placing the image capturing device 2 inside the refrigerator 1 and making a setting to the first image capturing mode, it is possible for the user to view the latest image data taken by the image capturing device 2 at the installed location. For example, it is possible to view the types of food inside the fridge through the mobile terminal 4, etc. The designated time may be preset by default or may be specified by the user through the operating portion 20.

In the second image capturing mode, image capturing is performed after a prescribed time has elapsed from the operation of the set switch 20c. The prescribed time indicates a certain time period (10 seconds for example) given from the installation of the image capturing device 2 to an execution of automatic image capturing. Thus, in the second image capturing mode, it is possible to execute automatic image capturing with the door 1b closed after elapse of 10 seconds from the operation of the set switch 20c when the image capturing device 2 has been set to the door pocket of the door 1b of the refrigerator 1. In the second image capturing mode, it is possible to learn the suitability of the location where the image capturing device 2 is installed by viewing the image captured with the door 1b closed through the mobile terminal 4, etc. The second image capturing mode is a test shot (for locationing purposes) mode, so to speak, of the image capturing device 2.

The set switch 20c serves, for example, as a determining key for determining the execution of the mode selected by the mode selection switch 20b or for starting the execution of the selected mode. These switches 20a to 20c are not limited to the above described types or the above described methods of operation. For example, the mode switch 20b may be configured as a sliding switch which is slid to determine the selection of various modes. The number of selectable modes may be increased or decreased from the selections described above.

The image capturing side controller 18 of the present embodiment is configured to append identification data to the captured images to distinguish the mode in which the images were captured. For example, an identification data indicating that the image has been captured in the second image capturing mode is appended to image data captured in the second image capturing mode. The image capturing side controller 18 may be configured to distinguish the image data of the two modes by appending the identification data to either or both of the image data captured in the first image capturing mode and the second image capturing mode.

The image capturing side controller 18 is configured primarily by a microcomputer and is responsible for the overall control of the image capturing device 2. As illustrated in FIG. 3, the image capturing side controller 18 includes components such as a CPU 18a, ROM 18b, RAM 18c, RTC 18d, etc. The image capturing side controller 18 is configured to execute controls to prepare the environment for image capturing such as a controlling the timing of image capturing carried out by the image capturing portion 11 and controlling the timing in which the image capturing light 13 is illuminated. The image capturing side controller 18 also serves as a control unit configured to execute controls for transmitting image data through the communication module 17 and for performing image processing such as modifying the captured images. The ROM 18b stores a control program for executing processes in multiple modes.

The image capturing side controller 18 is connected to the image capturing portion 11, the lights 13, the operating portion 20, the communication module 17, and the detecting portion 14. The detecting portion 14 includes the optical sensor 14a and a sound sensor 14b for example. The optical sensor 14a is an illuminance sensor configured to detect the illuminance around the image capturing device 2 and detects optical energy of a prescribed wavelength band. The optical energy detected by the optical sensor 14a is converted into electric signal and outputted to the image capturing side controller 18. The sound sensor 14b is configured to detect sound energy produced in the prescribed frequency band, which is produced in the present embodiment by a panel buzzer 29 or in-fridge buzzer 33 described herein. The sound energy detected by the sound sensor 14b is converted into electric signal and outputted to the image capturing side controller 18.

As later described in detail, the image capturing device 2 normally stands-by in a low power mode consuming relatively less electric power compared to the normal operation mode and returns to the normal operation mode when executing image capturing in the first image capturing mode or the second image capturing mode. The captured images data is transmitted to external devices through the communication module 17 by unidirectional communication. When the system time needs to be set, in other words, when in the time setting mode, time is acquired or received in the normal mode in response to request from the communication module 17 side by bidirectional communication. In the present embodiment, it is possible to perform unidirectional communication in which communication is directed one way toward the external devices and a bidirectional communication in which data communication is exchanged bidirectionally between the image capturing device 2 and the external devices through radio waves. There is no need to perform both outgoing and incoming communications in a unidirectional communication. There are less occasions to perform bidirectional communication under the time setting mode compared to the frequency of image capturing. Thus, unidirectional communication is preferred over bidirectional communication in terms of power consumption.

The fridge-side controller 21 of the refrigerator 1 illustrated in FIG. 3 is configured primarily by a microcomputer and is responsible for the overall control of the refrigerator 1. The fridge-side controller 21 includes a CPU 21a, a ROM 21b, a RAM 21c, a timer 21d, etc. The fridge-side controller 21 is connected to the refrigeration cooling mechanism 25 and the freeze cooling mechanism 26 configured by a known refrigeration cycle, etc. The fridge-side controller 21 is further connected to a door sensor 24 of the refrigerator 1, a later described control panel 22, and the temperature sensor 23. The fridge-side controller 21 is configured to control the drive of the cooling mechanisms 25 and 26 based on the in-fridge temperature detected by the temperature sensor 23 and the opened/closed status of the door detected by the door sensor 24 so that operational status set by the control panel 22 can be achieved.

The control panel 22 is provided with a panel display and a panel LED neither of which are illustrated, and a panel buzzer 29. The panel display and the panel LED display the specified settings and illuminate the operable switches. The panel buzzer 29 is configured by a piezoelectric buzzer for example and notifies the type of operations made by producing a sound (sound energy) depending upon the operations made. In the present embodiment, the panel buzzer 29 is capable of outputting a sound of 6 kHz. The panel buzzer 29 also serves as a transmitting unit configured to produce sound energy in order to transmit information pertaining to image capturing to the image capturing device 2 through a prescribed ringing pattern.

The in-room buzzer 33 illustrated in FIG. 3 comprises a piezoelectric buzzer provided for example in a refrigeration chamber. The in-room buzzer 33 is configured to produce sound energy and serves as a transmitting unit. The in-room buzzer 33 is capable of outputting sound of 20 kHz for example beyond the audible range and is detectable by the sound sensor 14b. A blower 31 is provided for circulating cool air inside the refrigerator 1 when operated normally. The blower 31 is capable of producing sound energy such as wind noise and motor sound by increasing the rotation count to be greater than the rotation count observed during normal operation. The buzzers 29 and 33 as well as blower 31 may be selectively configured to serve as a transmitting unit.

An in-room lighting 30 and an in-room LED 32 are both provided, for example, inside the refrigeration chamber, etc. The in-room lighting 30 is configured to produce optical energy by illuminating when the door is opened. The in-room lighting 30 is configured to be capable of flickering under the control of the fridge-side controller 21. The in-room LED 32 is configured to produce light (optical energy) belonging to a prescribed frequency band capable of being detected by the optical sensor 14a in order to transmit information to the image capturing device 2. The in-room LED 32 is capable of flickering in a certain pattern to indicate information pertaining to image capturing. The in-room lighting 30 and the in-room LED 32 both serve as a transmitting unit configured to transmit information pertaining to image capturing to the image capturing device 2 through optical energy. It is thus, possible to use the in-room lighting 30 and the in-room LED 32 selectively.

The communication adaptor 34 is provided detachably to the refrigerator 1. The communication adaptor 34 is configured to exchange communication with the access point 3 and with the mobile terminal 4, etc. located in the room. The communication adaptor 34 is further configured to be capable of communicating directly with the image capturing device 2 without the intervention of the access point 3. The communication adaptor 34 is also used for visualization of system status, etc. as described earlier and thus, is basically operative while the refrigerator 1 is in service. Though only the refrigerator 1 is illustrated in FIG. 1, the communication adaptor 34 is also provided to other home appliances such as an air conditioner to establish a network of home appliances.

A communication unit undertaking the communication between, for example, the mobile terminal 4 and the image capturing device 2 is configured by the communication module 17, the communication adaptor 34, the access point 3, and the external network 5, etc. The communication between the mobile terminal 4 and the image capturing device 2 may be exchanged directly through radio waves without the intervention of the communication adaptor 34 of the refrigerator 1 or indirectly through the intervention of the communication adaptor 34. In case of the latter, information may be transmitted to the image capturing device 2 through the transmitting unit to exchange information between the image capturing device 2 (controller 18) and the refrigerator 1 (controller 21). That is, information pertaining to image capturing is conveyed by, for example, causing the flickering and the ringing in a pattern which will not occur when the refrigerator 1 is under normal use. It is possible for the image capturing side controller 18 to identify the information pertaining to image capturing conveyed by the flickering pattern or the ringing pattern by referring to a prescribed data table. A description is given herein with an assumption that direct communication is exchanged between the mobile terminal 4 and the image capturing device 2, meaning that the communication adaptor 34 of the refrigerator 1 can be omitted.

The operation of the above described configuration is given herein.

The user is to place the image capturing device 2 at the desired location inside the room of the residence 7. Since the image capturing device 2 is provided with an image capturing light 13, it is possible to place it in a dark room such as the interior of the refrigerator 1. The following description is based upon an assumption that the image capturing device 2 is installed at the door pocket of the right-side door 1b of the refrigerator 1 as indicated by the broken line in FIG. 1 so that the main surface 10a of the image capturing device 2 is oriented toward the back of the refrigeration chamber interior with the door 1b closed when capturing the image of the fridge interior. The flowcharts provided in FIGS. 4 to 6 indicate the control programs executed by the image capturing side controller 18 and are started when the power switch 20a of the image capturing device 2 is turned ON.

When power of the image capturing device 2 is turned ON by the power switch 20a (step S1 of FIG. 4), the image capturing device 2 is controlled to the sleep mode (step S2). The sleep mode corresponds to low power mode which consumes less electric power compared to the normal operation mode. When communication module 17 is constantly operative in a system configuration capable of bidirectional communication, power consumption will increase and require battery 16 replacement or charging in one or few days. Thus, the image capturing side controller 18 is configured, while in the sleep mode, to judge the presence/absence of settings made in the operating portion 20.

The bidirectional communication of the image capturing device 2 is executed when the time setting mode is specified (step S3: YES, step S4) by the user operation of the mode switch 20b. Though not illustrated, the image capturing side controller 18 returns to the normal operation mode and receives time information from the time server through the external network 5 in response to a request signal given from the communication module 17 side. It is thus, possible to correct the RTC 18d with the acquired time information even when the time indicated by the RTC 18d is incorrect. When the time setting process is completed at step S4, the control returns to the sleep mode (returned to the step S2). It is thus, possible to reduce power consumption as much as possible.

When it is desired to take a test shot immediately after installing the image capturing device 2 to the door pocket (the fridge interior), the mode switch 20b is operated to select the second image capturing mode which corresponds to a test shot mode (step S3: NO, step S5: NO, and step S7: YES). In such case, the image capturing side controller 18 proceeds to step S8 to execute the second image capturing process (see FIG. 6). In the second image capturing process, the image capturing side controller 18 returns to the normal operation mode (step S21) and judges whether or not a prescribed time has elapsed (step S22) after the set switch 20*c* has been operated. As described earlier, the prescribed time is a time period (10 seconds for example) given from the installation of the image capturing device 2 to an execution of automatic image capturing. The automatic image capturing is executed by the image capturing device 2 with the door 1*b* closed after the installation of the image capturing device 2 (step S23). When the image capturing side controller 18 makes a judgement that illuminance inside the fridge does not meet a prescribed illuminance based on the detection signal given by the optical sensor 14*a*, the image capturing side controller 18 lights the fridge interior. Then, the image capturing side controller 18 transmits the captured image data along with identification data indicating that the image data was taken as a test shot to the mobile terminal 4 or stores the same to the server 6 (step S24). After completing the second image capturing process, the process returns to the sleep mode (return to step S2).

When the user desires to perform image capturing on a periodic basis at the current location of the image capturing device 2 as the result of the test shot, the mode switch 20*b* is operated to select the first image capturing mode (step S5: YES). Then, the image capturing side controller 18 proceeds to step S6 to execute the first image capturing process (see FIG. 5). In the first image capturing process, the image capturing side controller 18 stands by in a sleep mode until the designated time arrives (step S11: YES) to execute a periodic image capturing with a prescribed periodicity. Then, the image capturing side controller 18 returns to the normal operation mode (step S12) on arrival of the designated time and captures an image of the fridge interior (step S13). The image capturing side controller 18 captures image of the fridge interior with lighting as was the case in the second image capturing process and transmits the captured image data to the mobile terminal 4 and/or the server 6 (step S14). Then, the image capturing side controller 18 returns to the sleep mode again (step S16). The image capturing side controller 18 executes periodic image capturing by repeating step S14 to S16 until a switch is made to other modes (step S15: NO).

When installing the image capturing device 2 or when receiving image data captured periodically, it is possible to display images of food stored in the fridge on the screen 4*a* of the mobile terminal 4 based on the received data. The mobile terminal 4 is capable of distinguishing the images captured in the second image capturing mode based on the identification data. For example, a notation that may read "taken on ∘∘ day" may be displayed on the screen 4*a* with the image captured in the first image capturing mode. Similarly, a notation that may read "test shot" may be displayed on the screen 4*a* with the image captured in the second image capturing mode.

As described above, the image capturing system 100 of the present embodiment is configured so that a device for capturing images is communicable with external devices through a communication unit. The system is provided with an operating portion 20 configured to make settings pertaining to image capturing, an image capturing device 2 serving as the device for capturing images and being configured to produce image data by periodically capturing images based on the settings made to the operating portion 20, and a display unit configured to produce a display output based on the image data.

Accordingly, the image capturing device 2 is configured to be communicable with external devices and a display output can be produced based on the image data captured by the image capturing device 2. It is thus, possible to view the images, periodically captured based on the settings made to the operating portion 20, through the display unit. This improves usability of the system and makes the system more suitable for practical use.

The operating unit for making settings pertaining to image capturing is not limited to the operating portion 20 of the image capturing device 2 but may be configured by an operating portion provided on an external device. For example, a touch panel of the mobile terminal 4 or a keyboard of the server 6 (neither illustrated) may serve as the operating unit which makes settings pertaining to image capturing to the image capturing device 2 through the communication unit. Such configuration provides effects similar to those described above.

The display unit is provided at the external device and the image data produced by the image capturing device 2 is transmitted to the external device through the communication unit. As a result, it is possible to view the images captured by the image capturing device 2 through the display unit of the external device located remotely from the image capturing device 2.

The image capturing device 2 is disposed at a storage provided with a door and is configured to be capable of capturing images of an interior of the storage. The image capturing device 2 is further configured to capture test images of the interior of the storage when a prescribed time period has elapsed after the settings have been made to the operating portion 20. Accordingly, it is possible to take test shots after securing enough time required for closing the door after image capturing device 2 is installed at the storage. It is possible to view the image taken by the image capturing device 2 immediately after installing the image capturing device 2 to the storage by setting the prescribed time as described above. This improves the usability of the system even more effectively. It is required to take test shots of the interior of the storage (room) after the door is shut especially when the image capturing device 2 is mounted on the door. Thus, it is effective to set the prescribed time.

The image capturing device 2 is disposed in a dark room. A lighting unit is provided at least at the image capturing device 2 or in the dark room. When capturing images, the image capturing device is configured to light the dark room by the lighting unit. Accordingly, it is possible to obtain an image of the interior of the dark room (an image of food in the storage in the embodiments) even when the illuminance of the dark room does not meet a prescribed level.

The image capturing device 2 is configured to transmit the image data to the external device through unidirectional communication. Accordingly, it is not required to keep the communication module 17 constantly operative for the possibility of receiving information through bidirectional communication. It is thus, possible to reduce power consumption. Bidirectional communication is performed in the present embodiment when mode switching is made. Unidirectional communication may indicate a communication mode in which the transmitting side and the receiving side are fixed and not interchangeable.

The image capturing device 2 is battery driven and is configured to normally standby in a low power mode consuming relatively less electric power compared to a normal operation mode. The image capturing device 2 is configured to return to the normal operation mode when capturing images. Accordingly, it is possible to reduce electricity consumption while in standby since the image capturing device 2 does not have to standby in the normally operating state.

The external device comprises a server 6 provided with a storing unit configured to store image data acquired through the communication unit. Accordingly, it is possible to accumulate image data acquired periodically to the storing unit of the server 6 while allowing image data to be retrieved from the server 6 through other external devices.

The external device comprises a communication terminal provided with a terminal side display unit configured to display images based on image data acquired through the communication unit. Accordingly, it is possible to view the image displayed on the display unit (screen 4a for example) of the communication terminal and thereby improve user friendliness.

The display unit is configured to display an image originating from image data captured with a prescribed periodicity and an image originating from image data produced by a test shot taken when a prescribed period has elapsed after the settings have been made to the operating portion 20 in a distinguished manner. Accordingly, it is possible to distinguish the two images even when the former and the latter image data may both be displayed through the displaying unit. It is thus, possible to identify the test shot image with ease.

The image capturing device 2 is configured to distinguish image data captured with a prescribed periodicity and image data produced by a test shot taken when a prescribed period has elapsed after the settings have been made to the operating portion 20 by appending identification data to at least either of the image data when transmitting each type of image data to the external device. Accordingly, it is possible to distinguish each of the images when viewing them through the external device by providing an identification to each of the image data captured periodically and the image data taken by test shots.

The image capturing device 2 is configured to be capable of selecting either a first image capturing mode in which images are captured repeatedly according to prescribed conditions or a second image capturing mode in which images are captured when predetermined period has elapsed after the settings have been made to the operating portion 20. Accordingly, it is possible to select image capturing to be carried out by the image capturing device 2 under either of the first image capturing mode or the second image capturing mode depending upon the user's objectives and thereby improving usability of the system.

The prescribed conditions for determining the timing of image capturing under the first image capturing mode may be a timing in which the amount of food storage has changed, or a timing in which the amount of food storage is presumed to have changed. For example, a weight sensor may be provided to the refrigerator 1 to detect the weight of food placed in the container or on the shelves (neither illustrated) of the fridge interior. The timing in which the weight detected by the weight sensor has changed may be detected by the fridge side controller 21 and automatic image capturing may be executed at the detected timing. It is thus, possible to eliminate wasteful image capturing (communication losses) by only allowing images to be captured when the storage amount of food has changed.

The detecting unit for detecting the amount of food storage may comprise an infrared sensor or an image recognizing unit. The change in the food storage status may be detected by the fridge-side controller 21 based on the signals given by the sensor and based on the image data. A light detecting unit configured to detect amount of light in the fridge or a door sensor 24 may be used to make a presumption by the fridge side controller 21 that the food inside the fridge has been consumed or that food has been added based on the detection of opening of the door.

In some embodiments described above, the image capturing device 2 was installed inside the refrigerator 1. However, the image capturing device 2 may be installed in a room of a residence 7, other types of storages, or a dark room.

The image capturing device 2 need not be detachably attached to the refrigerator 1 but may be provided to be structurally integral with the refrigerator 1 so as to be capable of capturing images of the fridge interior. The image capturing side controller 18 may be provided inside the fridge side controller 21. In such case, the communication adaptor 34 may be configured to also function as a communication module 17. When the image capturing device (camera) is provided structurally integral with the storage, though not illustrated, the test shot features described above becomes effective when the image capturing portion or the image capturing light disposed on the wall or the door of the fridge interior is capable of changing its orientation or is capable of being relocated by establishing a cable connection with the controller.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image capturing system configured so that an image capturing device is communicable with an external device through a communication portion, the image capturing device comprising:
    a body serving as an outer shell of the image capturing device;
    an operating portion provided on the body and being configured to make settings pertaining to image capturing by a user operation,
    an image capturing portion configured to produce image data by capturing images and being provided inside the body; and
    a communication portion provided inside the body and is configured to transmit the image data captured by the image capturing portion to the external device,
    wherein the image capturing device is disposed inside a storage provided with a door at a location at which a condition of an interior of the storage can be easily identified and comprises a lighting unit provided in the storage as a dark room or at the image capturing device, wherein when capturing images, the image capturing device is configured to light the dark room by the lighting unit,
    wherein the external device is located outside the storage as a device independent of the image capturing device and comprises a display unit configured to produce a display output based on the image data, wherein the image capturing device is configured to be capable of capturing images based on the settings made through the operating portion to capture images inside the storage and capturing images in a first image capturing mode in which images are captured repeatedly with prescribed periodicity on a daily basis, wherein the image capturing device is configured to take a test shot for imaging the interior of the storage, when a prescribed time period has elapsed after the settings have been made by the operating portion, the test shot being captured based on the settings made, wherein the image capturing device is configured to transmit the image data captured based on the settings made or captured under the first image capturing mode to the external device through a unidirectional communication performed through the communication portion, and wherein the image capturing device is battery driven and is configured to normally standby in a low power mode consuming relatively less electric power compared to a normal operation mode, the image capturing device being configured to return to the normal operation mode when capturing images.

2. The image capturing system according to claim 1, wherein the external device comprises a server provided with a storing unit configured to store the image data acquired through the communication portion.

3. The image capturing system according to claim 1, wherein the external device comprises a communication terminal provided with a terminal side display unit configured to display images based on the image data acquired through the communication portion.

4. The image capturing system according to claim 1, comprising an operating portion provided on the body and is configured to make settings pertaining to image capturing by a user operation, wherein the display unit is configured to distinguish and display an image originating from the image data captured regularly with a prescribed periodicity and an image originating from image data produced by a test shot taken when a prescribed period has elapsed after the settings have been made by the operating portion.

5. The image capturing system according to claim 1, comprising an operating portion provided on the body and is configured to make settings pertaining to image capturing by a user operation, wherein, to distinguish the image data captured regularly with a prescribed periodicity and image data produced by a test shot taken when a prescribed period has elapsed after the settings have been made by the operating portion, the image capturing device is configured to append identification data to at least one of the image data and transmit the image data to the external device.

6. The image capturing system according to claim 1, comprising an operating portion provided on the body and is configured to make settings pertaining to image capturing by a user operation, wherein the image capturing device is configured to be capable of selecting either the first image capturing mode or a second image capturing mode in which an image is captured when a predetermined period has elapsed after the settings have been made by the operating portion.

7. An image capturing device for use in an image capturing system provided with a display unit configured to produce a display output based on image data, the image capturing device comprising:

a body serving as an outer shell of the image capturing device;

an operating portion provided on the body and being configured to make settings pertaining to image capturing by a user operation, an image capturing portion configured to produce the image data by capturing images and being provided inside the body; and a communication portion provided inside the body and is configured to transmit the image data captured by the image capturing portion to the external device, wherein the image capturing device is disposed inside a storage provided with a door at a location at which a condition of an interior of the storage can be easily identified and comprises a lighting unit provided in the storage as a dark room or at the image capturing device, wherein when capturing images, the image capturing device is configured to light the dark room by the lighting unit, wherein the external device is located outside the storage as a device independent of the image capturing device and comprises a display unit, wherein the image capturing device is configured to be capable of capturing images based on the settings made through the operating portion to capture images inside the storage and capturing images in a first image capturing mode in which images are captured repeatedly with prescribed periodicity on a daily basis, wherein the image capturing device is configured to take a test shot for imaging the interior of the storage, when a prescribed time period has elapsed after the settings have been made by the operating portion, the test shot being captured based on the settings made, wherein the image capturing device is configured to transmit the image data captured based on the settings made or captured under the first image capturing mode to the external device through a unidirectional communication performed through the communication portion, and wherein the image capturing device is battery driven and is configured to normally standby in a low power mode consuming relatively less electric power compared to a normal operation mode, the image capturing device being configured to return to the normal operation mode when capturing images.

8. A storage comprising an image capturing device configured to be communicable with an external device through a communication portion, the image capturing device comprising:

a body serving as an outer shell of the image capturing device;

an operating portion provided on the body and being configured to make settings pertaining to image capturing by a user operation, an image capturing portion configured to produce image data by capturing images and being provided inside the body; and a communication portion provided inside the body and is configured to transmit the image data captured by the image capturing portion to the external device, wherein the image capturing device is disposed inside a storage provided with a door at a location at which a condition of an interior of the storage can be easily identified and comprises a lighting unit provided in the storage as a dark room or at the image capturing device, wherein when capturing images, the image capturing device is configured to light the dark room by the lighting unit, wherein the external device is located outside the storage as a device independent of the image capturing device and comprises a display unit configured to produce a display output based on the image data, wherein the image capturing device is configured to be capable of capturing images based on the settings made through the operating portion to capture images inside the storage and capturing images in a first image capturing mode in which images are captured repeatedly with prescribed periodicity on a daily basis, wherein the image capturing device is configured to take a test shot for imaging the interior of the storage, when a prescribed time period has elapsed after the settings have been made by the operating portion, the test shot being captured based on the settings made, wherein the image capturing device is configured to transmit the image data captured based on the settings made or captured under the first image capturing mode to the external device through a unidirectional communication performed through the communication portion, and wherein the image capturing device is battery driven and is configured to normally standby in a low power mode consuming relatively less electric power compared to a normal operation mode, the image capturing device being configured to return to the normal operation mode when capturing images.

* * * * *